United States Patent [19]

Guest

[11] Patent Number: 4,852,043

[45] Date of Patent: Jul. 25, 1989

[54] DAISY-CHAIN BUS SYSTEM WITH TRUNCATION CIRCUITRY FOR FAILSOFT BYPASS OF DEFECTIVE SUB-BUS SUBSYSTEM

[75] Inventor: David H. Guest, Balerno, United Kingdom

[73] Assignee: Hewlett-Packard Company, Palo Alto, Calif.

[21] Appl. No.: 52,649

[22] Filed: May 20, 1987

[30] Foreign Application Priority Data

May 21, 1986 [GB] United Kingdom ............... 8612396

[51] Int. Cl.$^4$ .................... G06F 3/00; G06F 13/00; G06F 13/42; H04J 3/02
[52] U.S. Cl. ................................... 364/900; 370/85; 364/260.2; 364/260.8
[58] Field of Search ... 364/200 MS File, 900 MS File; 370/85, 88

[56] References Cited

U.S. PATENT DOCUMENTS

| | | | |
|---|---|---|---|
| 4,451,886 | 5/1984 | Guest et al. | 364/200 |
| 4,675,865 | 6/1987 | DeVries et al. | 370/85 |
| 4,680,753 | 7/1987 | Fulton et al. | 370/85 |
| 4,683,563 | 7/1987 | Rouse et al. | 370/16 |
| 4,719,621 | 1/1988 | May | 370/85 |

Primary Examiner—Archie E. Williams, Jr.
Assistant Examiner—Ayni Mohamed
Attorney, Agent, or Firm—Karl E. Bring

[57] ABSTRACT

A plurality of data transmitting and receiving devices (1) are inter-connected by an interface bus system configured as two or more sub-bus systems (2,3,4) connected into a chain by a corresponding number of communication links (5). Each sub-bus system (2,3,4) includes a communications arrangement (7) interfacing the sub-bus system with the associated link or links (5). The overall interface bus system operates in accordance with a data transfer protocol that involves a handshake procedure requiring the participation of all active devices (1) connected to the bus system. In order to avoid the whole installation locking up upon one sub-system (3,4) becoming non-responsive, each communication arrangement (7), other than the one associated with the last sub-bus system (4) in the chain, is arranged to check the responsiveness of its down-chain neighbour when requested to do so by a control input from the installation controller (1A). In the event of the down-chain system being unresponsive, the communications arrangement (7) functionally truncates the chain at its sub-bus system.

1 Claim, 8 Drawing Sheets

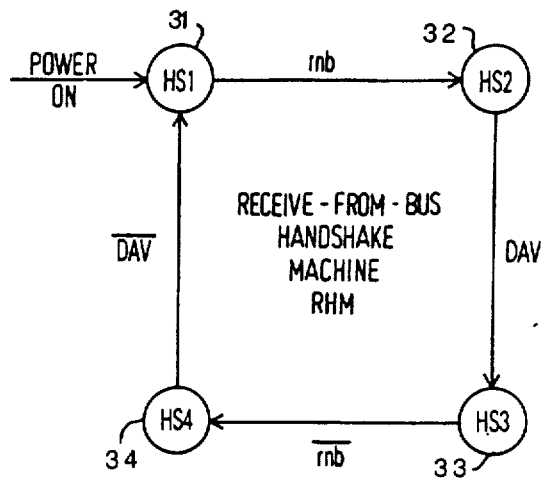
FIG 3A
| | tnb | NRFD | NDAC |
|---|---|---|---|
| HS1 | F | T | T |
| HS2 | F | F | T |
| HS3 | T | T | T |
| HS4 | F | T | F |
FIG 3B
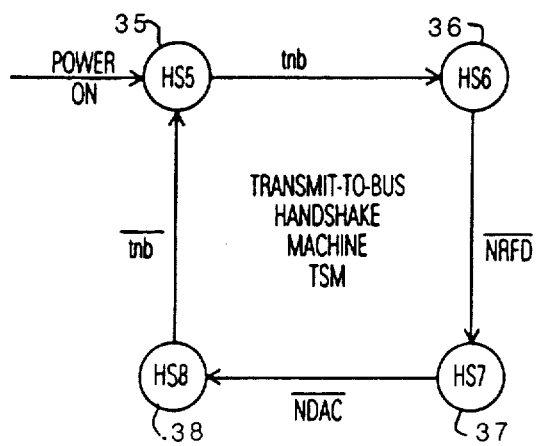
FIG 4A
| | rnb | DAV |
|---|---|---|
| HS5 | T | F |
| HS6 | T | F |
| HS7 | T | T |
| HS8 | F | F |
FIG 4B

DAISY-CHAIN BUS SYSTEM WITH TRUNCATION CIRCUITRY FOR FAILSOFT BYPASS OF DEFECTIVE SUB-BUS SUBSYSTEM

BACKGROUND OF THE INVENTION

The present invention relates to a chain-configured interface bus system and a communications arrangement for use therein.

Installations are known in which clusters of data transmitting and receiving devices are inter-connected by an interface bus sytem that comprises a respective sub-bus system associated with each cluster of devices, and communication links connecting the sub-bus systems into a chain. Generally, a system controller is connected to one of the chain-end sub-bus sytems (herein designated the head or up-chain end of the the system) and serves to set up the installation for the transfer of data between the devices via the interface bus system. Each sub-bus system takes the form of a sub-bus to which the devices of the associated cluster are connected, and a communication arrangement for transferring data over the links between the sub-bus system and its up-chain and down-chain neighbours. The communications arrangement comprises an up-chain bus extender for interfacing the sub-bus with the up-chain link (where present) and a down-chain bus extender for interfacing the sub-bus with the down-chain link (also where present).

During data transfer from a currently-selected data-transmitting device (source) to the or each currently-selected data-receiving device (acceptor), each sub-bus system can be considered as having one source and one or more acceptors. The sources of the sub-bus systems that do not include the original data-transmitting device are constituted by the bus extenders that receive the data from the originating sub-bus system over the communication links of the chain; the bus extenders that pass on the data from their own sub-bus to a neighbouring system act as acceptors in their sub-bus systems.

The transfer of data between devices is usually governed by a handshake procedure between the current source and acceptors. One widely used handshake procedure is that forming part of the IEEE-488 protocol standard and described in U.S. Reissue Pat. No. 29,246 (assignee Hewlett-Packard Company). With an installation including a plurality of sub-systems connected into a chain, it is possible to implement the handshake procedure independently in each sub-bus system. However, for various reasons, such an independence of the handshake procedures on the sub-bus systems is not entirely satisfactory. As a result, an alternative procedure has found acceptance in which the bus extenders are effectively transparent and the handshake procedure carried out by the original data-transmitting device involves the participation of all current acceptors regardless of their sub-bus system association. This is achieved by arranging for the 'acceptor' bus extender on the original source's sub-bus system to delay its handshake responses with the source until it has received appropriate responses from the neighbouring sub-bus system extender to which it is linked indicating that the handshake procedure in which this extender is involved as a source, has progressed to an appropriate stage. Thus the 'acceptor' bus extender on the originating sub-system may delay indicating data acceptance until all the acceptors of the neighbouring sub-system have indicated their acceptance to the source bus extender of that sub-system and that extender has communicated back this acceptance to the acceptor bus extender of the originating sub-bus system. Of course, one of the acceptors of the neighbouring system may itself be a bus extender in which case the indication of data acceptance by this neighbouring system will be delayed until the sub-bus system fed by its acceptor bus extender has indicated data acceptance, and so on along the chain of sub-bus systems.

A description of one arrangement for inter-relating the handshake procedures on neighbouring sub-bus systems to achieve the foregoing inter-dependence is given for the IEEE-488 protocol handshake procedure in U.S. Pat. No. 4,451,886 (assignee Hewlett-Packard Ltd).

Although the purpose and effect of rendering the handshake procedures on the sub-bus systems inter-dependent, is to overcome certain disadvantages exhibited by independent-handshake schemes, a drawback exists in that if a sub-bus system should fail to respond to handshake related signals from its neighbouring sub-bus system, then the handshake procedure in this latter system is frozen which, in turn, freezes the whole system. One reason why a sub-bus system might fail to respond is that its local power supply has been switched off by mistake, or the communicating link has been broken.

It is an object of the present invention to provide a chain-configured interface bus system which while exhibiting inter-dependence of sub-bus systems, is capable of continued but reduced operation in the presence of a non-responsive sub-bus system.

SUMMARY OF THE INVENTION

According to one aspect of the present invention there is provided a chain-configured interface bus sytem for inter-connecting a plurality of data transmitting and receiving devices to enable data transfer therebetween, such that the interface bus system has at least two sub-bus systems interconnected via an appropriate number of communication links to form a chain having a first chain-end sub-bus system, zero, one or more intermediate sub-bus systems, and a second chain-end sub-bus system, and each said sub-system has a sub-bus to which one or more said devices can be connected, and communication devices for communicating the sub-bus with the or each neighbouring sub-bus system via the corresponding said link, the interface bus system being arranged to implement a data transfer protocol between devices connected thereto which includes a handshake procedure requiring the participation of all sub-bus systems, characterised in that:

each communication device, other than that of said second chain-end sub-bus system, is so arranged that upon receiving a predetermined test request signal which in use of the system is generated by devices associated with the first chain-end sub-bus system, the communication device seeks to pass on the request down the chain to its neighbouring sub-bus system further away from said first chain-end sub-bus system;

each communication device, other than that of said first chain-end sub-bus system, is operative subsequent to receipt of said test request to send a communication back to its neighbouring up-chain sub-bus system; and each communication device, other than that of said second chain-end sub-bus system, is operative following receipt of said test request to check for the receipt of said communication back from its down-chain neighbouring sub-bus system, the communication means being further operative, in the event of the down-chain system failing to communicate back, to functionally truncate the chain at its own sub-bus system such that participation of the or each down-chain system is no longer required to complete said data-transfer handshake.

Where the data-transfer protocol implemented by the system is the IEEE-488 protocol, then said test request is advantageously constituted by the Interface Clear signal IFC.

Preferably, each communications device, other than that of said second chain-end sub-bus system, has a down-chain bus extender for interfacing the associated sub bus with the neighbouring down-chain system via the corresponding link, and each communication device other than that of said first chain-end sub-bus system, comprises an up-chain bus extender for interfacing the associated sub bus with the neighbouring up-chain system via the corresponding link, each said bus extender including a handshake machine interfacing with the associated sub bus and link such as to regulate, in cooperation with the handshake machine of the extender at the opposite end of the link, the passing of data between the sub-bus systems concerned; characterised in that each communication device with a down-chain bus extender further has a truncation state machine operatively associated with the down-chain extender and having a first state in which the down-chain extender is arranged to function normally, a second state entered upon receipt of said test request, and a third state in which the handshake machine of the down-chain extender is set to freewheel in correspondence to changes on the sub bus of the sub-bus system, the truncation machine being arranged to exit from its second state into its first state or third state in dependence on whether a said communication back is received from the neighbouring down-chain sub-bus system.

According to another aspect of the present invention, there is provided a communications arrangement for interfacing a first sub-bus system with a second sub-bus system via a communications link and a second communications arrangement associated with the second sub-bus system; such that the communications arrangement has a bus extender including a handshake machine arranged to exchange control signals with the first sub-bus system and with the link whereby to govern the passing of data between devices connected to both sub-bus systems in accordance with a handshake procedure requiring the participation of all said devices, characterised in that the communications arrangement further has a truncation device having:

a first state in which the bus extender is arranged to operate normally in passing data between the devices,
—a second state in which the truncation device is operative to check the ability of the second communications arrangement to communicate over the link, and a third state in which the communications arrangement is arranged to functionally isolate the first sub-bus system from the second with the handshake machine being arranged to enable continued operation of the first sub-bus system without participation of devices connected to the second system, the truncation means being arranged to pass into its second state in response to a predetermined control input and to exit from its second state to its first or third state in dependence on whether or not said check produces a positive result.

BRIEF DESCRIPTION OF THE DRAWINGS

A chain-configured interface bus system embodying the invention will now be described, by way of example, with reference to the accompanying diagrammatic drawings, in which:

FIGS. 3A and B are respectively a state diagram and output signal table of a receive-from-bus handshake machine of the FIG. 2 bus extender;

FIGS. 4A and B are respectively a state diagram and output signal table of a transmit-to-bus handshake of the FIG. 2 bus extender;

DETAILED DESCRIPTION OF THE PREFERRED EMBODIMENT

Figure 1:
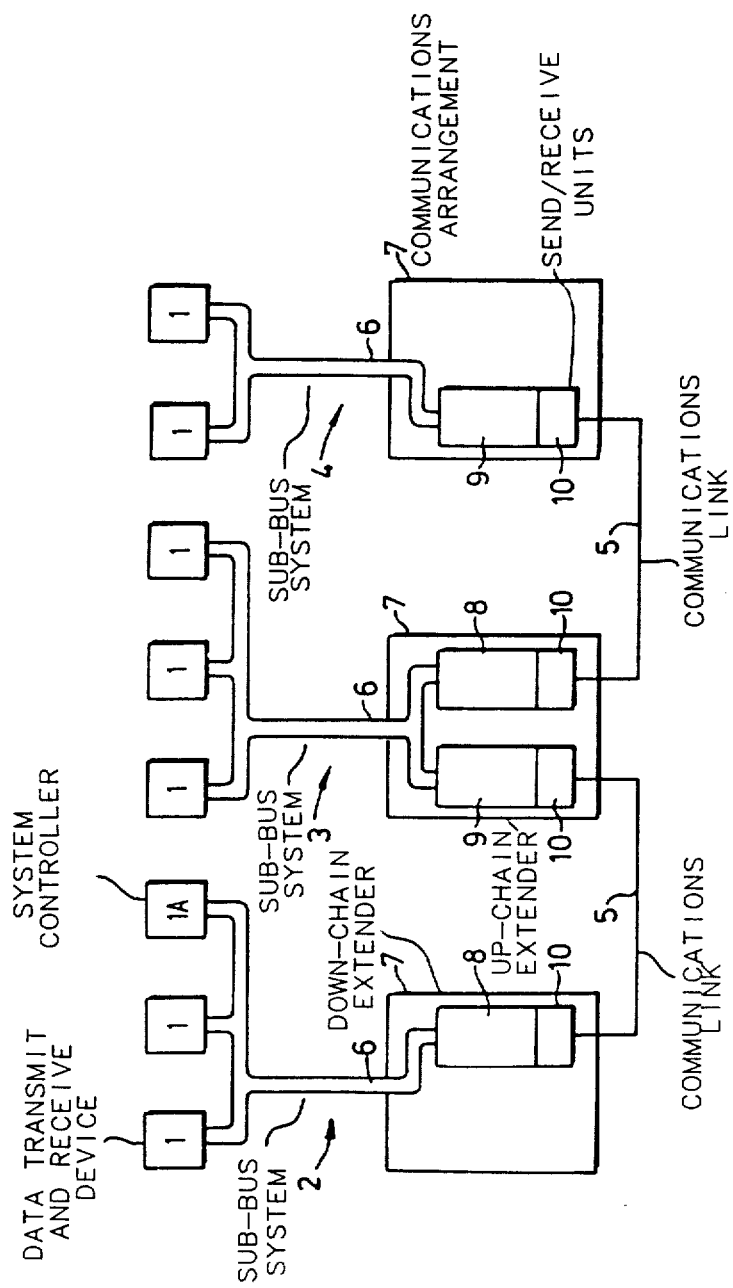
FIG. 1 is a block diagram of the bus extended system with a plurality of data transmitting and receiving devices connected thereto.

FIG. 1 shows an interface bus system used to interconnect a plurality of data transmitting and receiving devices 1. The interface bus system has, in the present example, three sub-bus systems 2,3,4 and two communications links 5 that service to inter-connect the sub-bus systems into a chain. One of the devices connected to the sub-bus system constitutes a system controller for controlling data transfer over the bus system, this device being referenced 1A in the drawings. The association of the system controller 1A with the sub-bus system 2 makes it convenient to designate this sub-bus system as the head of the chain of sub-bus systems; conversely, the sub-bus system 4 can be considered as the chain-end system. The sub-bus system 3 is an intermediate system and it will be appreciated that the number of such intermediate sub-bus systems can vary from zero upwards depending on the length of the chain.

For convenience, in the following description references to 'up the chain' and 'down the chain' are to be taken to mean respectively in a direction along the chain towards and away from the head of the chain (that is, sub bus system 2). Each sub-bus system 2,3,4 comprises a sub-bus 6 to which associated devices 1 are connected, and a communication arrangement 7 for interfacing the sub-bus system with its neighbour or neighbours. Each communication arrangement in turn has a respective bus extender 8,9 for interfacing the associated sub bus 6 with the or each link 5. For reasons which will become apparent, it is convenient to distinguish between bus extenders 8 interfacing with a down-chain sub-bus system (hereinafter termed 'down-chain' extenders), and bus extenders 9 interfacing with an up-chain sub-bus system ('up-chain' extenders). Thus the communication arrangement 7 of the chain-head sub-bus system 2 comprises a single down-chain extender 8, while the arrangement 7 of the intermediate sub-bus system 3 has both an up-chain extender 9 and a down-chain extender 8; the chain-end sub-bus system 4 has a single up-chain extender 9.

The precise format in which information is conveyed over the links 5 between the sub-bus systems is determined by send/receive units 10 interposed between each bus extender 8,9 and the corresponding links.

During data transfer between the devices 1, each sub-bus system 2,3,4 operates to transfer data between a local data-transmitting device ('source') and one or more local data-receiving devices ('acceptors'). The talker of a sub-bus system may either be the original data-transmitting device 1 or a bus extender connected to the link over which data is being passed to that system; similarly, an acceptor may be constituted by a currently-selected data-receiving device or by a bus extender passing on the data further along the chain.

Data transfer between the source and acceptor or acceptors connected to the same sub bus 6 is governed by a protocol which, inter alia, includes a data-transfer handshake procedure. In the present example, data transfer is effected in accordance with the IEEE-488 1978 protocol standard. Thus, as can be seen from FIG. 2 which illustrates the sub-bus system 2 in greater detail, the sub-bus 6 comprises eight data lines DIO 1-8 for effecting bit-parallel, byte-serial data transfer over the bus, and a number of control lines for controlling the devices 1. For present purposes, only four of these control lines are of interest these being the three handshake signal lines NDAC ("Not Data Accepted"), NRFD ("Not Ready for Data"), DAV ("Data Valid"), and the system reset signal line IFC ("Interface Clear").

The handshake procedure involving the signals NDAC, NRFD and DAV is well documented in the art and will not therefore be described in detail herein except to note that each device 1 and bus extender 8,9 associated with a sub bus 6 is connected to the handshake lines NDAC, NRFD in a "wired-OR" arrangement such that when any of the devices or extenders asserts one of the handshake signals to be true, then this is the logic state transmitted by the corresponding bus line. Thus, if all devices but one have accepted a currently output data byte so that they endeavour to output NDAC as False, the NDAC line will remain True until the sole remaining device does accept the byte and takes its NDAC output False.

For the bus extenders 8,9 the signal NDAC, NRFD and DAV represent only one side of a more complex handshake procedure. However, before considering this handshake procedure more fully, the form of a bus extender 8,9 will be outlined.

Figure 2:
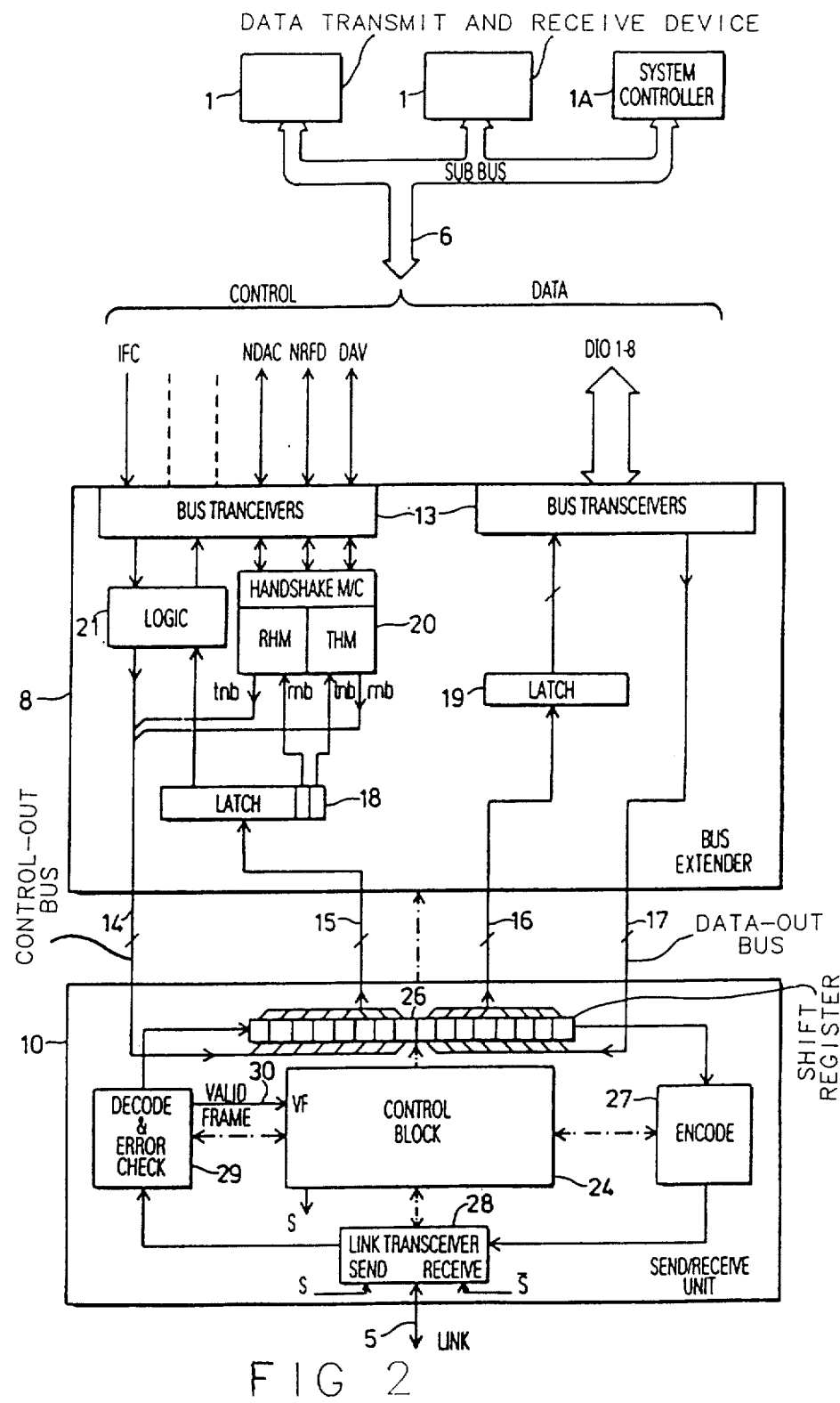
FIG. 2 is a diagram of a sub-bus system of FIG. 1 showing details of a prior-art communications arrangement of the sub-bus system, the arrangement comprising a bus extender and a send/receive unit.

Referring to FIG. 2, the bus extender 8 is made up of two halves, one dealing with the data lines of the bus 6 and the other concerned with the control lines. The two halves are basically similar with each interfacing with the corresponding sub bus lines through respective bus transceivers 13 and with the send/receive unit 10 via eight-line wide internal buses 14 (control out to link), 15 (control in link), 16 (data in from link), and 17 (data out to from link). The 'control-in' and 'data-in' buses 15, 16 are connected to respective latches 18,19 that feed signals to the corresponding transceivers 13, whereas the 'control-out' and 'data-out' buses 14,17 come from the transceivers 13. The control signal half of the extender further includes various logic and control circuitry 20,21 interposed between the buses 14,15 and the transceivers 13 for processing the in-going and outgoing signals and controlling the operation of the extender. For present purposes, the only portion of this circuitry of interest is the handshake machine 20 the operation of which will be outlined below.

The output of the appropriate sub-bus handshake responses required from a bus extender 8,9 is dependent on the progress of the data transfer operation in the sub-bus system at the other end of the link connected to the extender. This inter-dependence is defined by means of the handshake state machine 20 of the extender. This handshake machine has both a receive-from-bus handshake machine RHM and a transmit-to-bus handshake machine, the identity of the operative machine being dependent on the direction of data transfer.

As is illustrated in FIG. 3A, the receive-from-bus handshake machine RHM is a four-state machine with states HS1, HS2, HS3, and HS4, shown as blocks 31, 32, 33 and 34 respectively. The machine moves between states in dependence on the signal DAV (and its inverse) received from the local sub-bus 6, and in dependence on a signal rnb (and its inverse) received over the link 5 from the transmit-to-bus handshake machine of the extender at the other end of the link. The receive-from-bus handshake machine outputs signals NRFD and NDAC to the local sub-bus 6 and a signal tnb to the transmit-to-bus handshake machine at the opposite end of the link. The logic state True (T) or False (F) of each of the output signals is given in the Table shown in FIG. 3B for the various states HS1 to HS4 of the receive-from-bus handshake machine. As is illustrated in FIG. 4A, the transmit-to-bus handshake machine THM is also a four-state state machine with states HS5, HS6, HS7 and HS8, shown as blocks 35, 36, 37 and 38 respectively. The machine moves between states in dependence on the signals NRFD and NDAC received from the local sub bus 6, and in dependence on a signal tnb (and its inverse) received over the link 5 from the receive-from-bus handshake machine of the extender at the other end of the link. The transmit-to-bus handshake machine outputs the signal DAV to the local sub-bus 6 and a signal rnb to the receive-from-bus handshake machine at the opposite end of the link. The logic state of each of these signals is given in the Table shown in FIG. 4B for the various states HS5 to HS8 of the transmit-to-bus handshake machine.

A full description of the inter-working of the handshake machines at the opposite ends of a link is given in our afore-mentioned U.S. Pat. No. 4,451,886. For present purposes it is sufficient to note that the completion of the local sub-bus handshake by an extender 8,9 is dependent on receipt of the signal rnb or tnb over the link 5 (depending on whether the local sub-bus system is outputting or receiving data).

In the interface bus system under consideration, each send/receive unit (see FIG. 2) is arranged to effect half-duplex asynchronous serial data transmission and reception over its associated link 5 and to interchange data with the associated extender via the internal eight-line wide buses 14 to 17 (note, in the context of the send/receive unit, the term 'data' includes both the bits treated as data by the extender and the bits treated as control bits by the extender).

To send a frame of data over the link 5, the unit 10 reads in eight bits of control data in parallel from the bus 14 into the first half of a 16-bit shift register 26, and eight pure data bits in parallel from the bus 17 into the second half of the shift register 26. The cooperation of the extender 8 in this process is secured by control signals passed to the extender from the send/receive unit 10 and represented in the present case by a chain dotted line extending between the units 10 and 8.

Once the shift register has been loaded, its contents are shifted out in serial fashion into an encoder 27 where error coding is effected before the frame to be transmitted is passed to a link transceiver 28 for transmission. The transceiver 28 itself is operative when fed with a signal S to its SEND input, to add start and stop bits and transmit the frame over the link 5.

To receive a frame of data, the transceiver 28 is set into its receive mode by means of a signal $\overline{S}$fed to its RECEIVE input. Upon a frame being received over the link 5, the transceiver passes the frame onto a decoder 29 after having first stripped the frame of its start and stop bits. The decoder 29 decodes and error checks the received frame before outputting it into the register 26. The decoder 29 is arranged to generate a valid frame signal VF on line 30 only if the frame has been received error free (of course, if an error-correcting code has been used, then this judgement is only made after any error correction has been effected).

Figure 5:
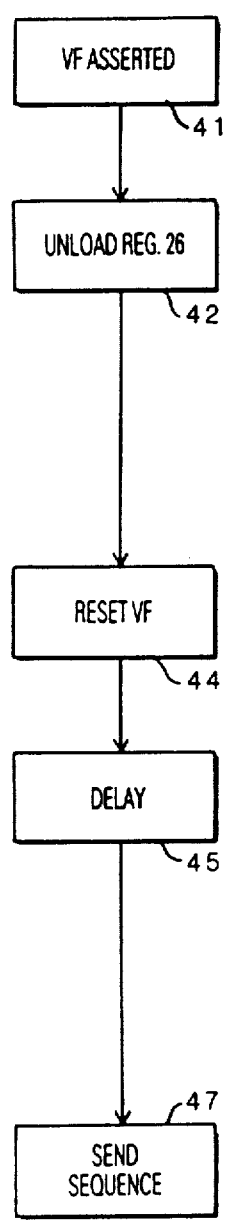
FIG. 5 is a diagram showing the sequencing of operations in the send/receive unit of FIG. 2.

The control of the operation of the send/receive unit 10 is effected by a control block 24. The control block 24 may be considered as a state machine having a receive state in which the unit is normally set to listen for receipt of a frame on the link 5 this sequence is shown in FIG. 5. Upon a valid frame being received (as indicated by signal VF in block H1), the control block first initiates reading of the frame in the register 26 into the bus extender 8 and then resets VF in block H2 and H4 respectively; thereafter, following a short delay to enable changes to take place on the sub bus in block 45, the control block proceeds to control the reading in of a new frame from the extender and the transmission of this frame over the link. During this latter action, the signal S is produced by the control block to appropriately set the transceiver 28 in block 47. The above sequence of actions is illustrated in FIG. 5. After the transmission of a frame, the control block 24 returns to its receive state.

From the the foregoing, it will be seen that the unit 10 is arranged to transmit a frame whenever a valid frame is received.

The send/receive unit 10 will not be described in further detail as the suitable implementations of such a unit will be apparent to persons skilled in the relevant art. Thus, in FIG. 2, only the control signals of interest in the present case have been mentioned while other timing and reset signals that would be produced by the control block 24 have only been indicated by the chain-dotted arrows extending between the control block and the units 26 to 29.

Before leaving the outline description of the send-/receive unit 10, it is worth noting that in order to avoid the unit 10 waiting indefinitely in its receive-frame mode when for any reason a frame is not forthcoming from the send/receive unit at the other end of the link 5, the unit is arranged to transmit a frame at the end of a pre-determined time-out period. This time-out feature is not, however, provided for units 10 associated with up-chain extenders.

In the arrangement described with reference to FIGS. 1 to 4, the passing of frames between each interlinked pairing of sub-bus systems is independent of the passing of frames between any other such pairing.

The arrangement of FIGS. 1 to 4 suffers from the drawback that if, for example, the link 5 between sub-bus systems 3 and 4 (see FIG. 1) becomes inoperative, then despite the continued transfer of frames over the link between the sub-bus systems 2 and 3, these latter systems are frozen in that the bus extender 8 of the sub-bus system 3 cannot complete its handshake with its local sub bus 6 due to the non-participation of the sub-bus system 4 in supplying the signals rnb and its inverse, or tnb and its inverse (depending on the data flow direction). With the handshake in sub-bus system 3 frozen, the extender 9 of that system cannot pass the appropriate signals to the extender 8 of sub-bus system 2 to enable that extender to continue its handshake with its local sub-bus so that system 2 is also frozen.

Figure 6:
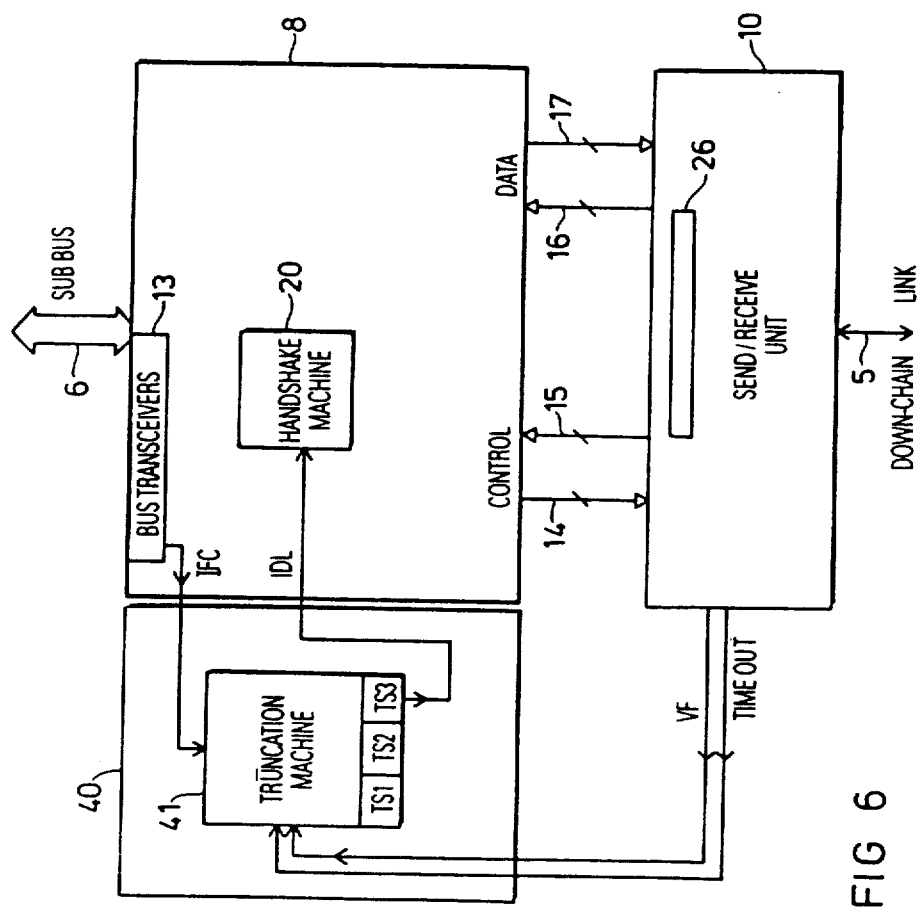
FIG. 6 shows the incorporation of a truncation machine into the FIG. 2 communications arrangement in accordance with a first embodiment of the present invention, only relevant details of the prior art extender and send/receive unit being shown.

To overcome the problem, in the embodiment of the present invention shown in FIG. 6, each down-chain extender 8 has an associated truncation unit 40 which in response to the control signal IFC being asserted by the system controller 1A, is effective to truncate the chain of sub-bus systems at its associated extender if the latter is unable to detect communications from its down-chain neighbouring sub-bus system. The truncation process is such that the remaining sub-bus systems can continue to operate without the need for a handshake response from the isolated sub-bus systems. This is achieved by modification of the operation of the handshake machine in the down-chain extender where truncation has occurred.

Referring in more detail to FIG. 6, only those components of the extender 8 and unit 10 of immediate relevance to the operation of the truncation unit 40 have been shown. The unit 40 comprises a truncation state machine 41 having three states namely a normal state TS1, a test state TS2, and a truncate state TS3. The truncation machine 41 is arranged to change between states in dependence on the following signals, namely the signal IFC (and its inverse) as latched into the machine 41 from the local sub bus via the transceivers 13, the signal VF output by the unit 10 after a valid frame has been received, and a TIME OUT signal generated in the control block 24 after the latter has been in its receive state for a predetermined period. The main output from the truncation machine is a signal IDL which is fed to the handshake machine 20 of the down-chain extender 8 when the truncation machine is in its truncate state TS3; the purpose of the signal IDL will be explained hereinafter.

Figure 7:
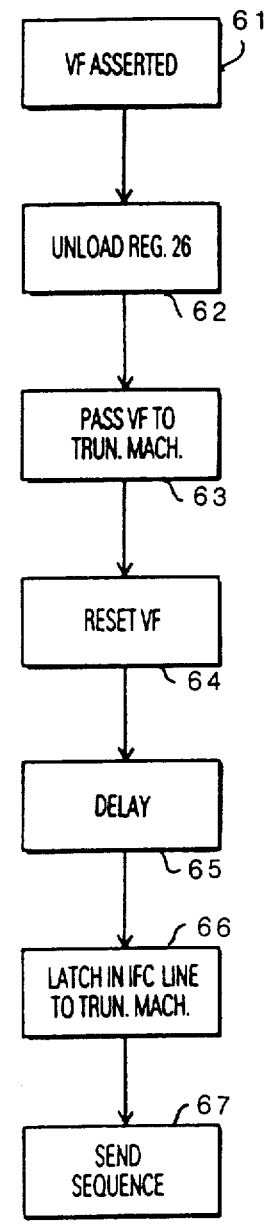
FIG. 7 is a diagram similar to FIG. 5 but showing additional operations relating to the truncation machine of FIG. 6.

Before describing the operation of the truncation machine 41, the timing of the operation of this machine relative to the sequence of actions initiated by a valid frame signal VF in the unit 10 will be briefly outlined with reference to FIG. 7. As before, following the receipt of a valid frame signal VF in block 61, the control block 24 first unloads the register 26 into the extender in block 62. The next action now taken by the control block is to pass VF to the truncation machine in block 63. Thereafter, the signal VF is reset in block 64 and a delay initiated in block 65. Upon expiry of the delay, the status of the IFC bus line is latched into the truncation machine 41 in block 66 and the send sequence is then entered in block 67. A similar series of action follows the assertion of the Timeout signal except that the contents of the register 26 are not unloaded into the extender.

Figure 8:
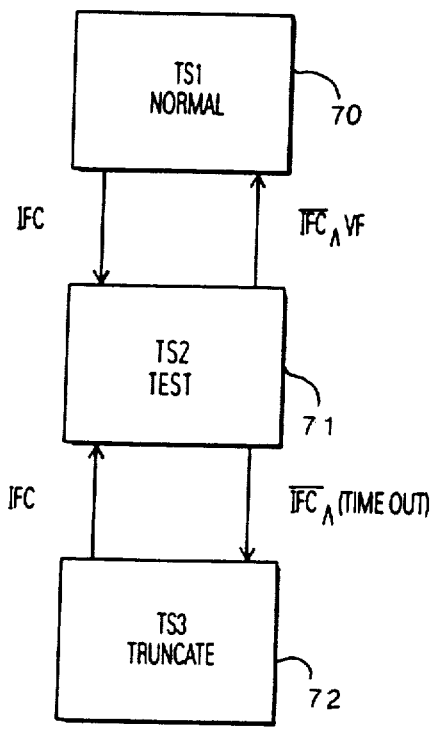
FIG. 8 is a state diagram illustrating the operation of the FIG. 6 truncation machine.

A state diagram illustrating the operation of the truncation machine 41 is shown in FIG. 8. When the truncation machine 41 is in its normal state TS1 in block 70, the bus extender 8 operates in its normal manner substantially as already described with reference to FIGS. 1 to 4. Upon the system controller asserting the interface clear signal IFC, this signal is received by the associated down-chain extender 8 and is in due course latched into its truncation machine 41. As a result, the truncation machine 41 passes into its test state TS2 in block 71. In this state, operation of the extender is permitted to continue as normal whereby a frame carrying the IFC signal is transmitted to the neighbouring down-chain sub-bus system 3 where it is placed on the local sub bus by the local up-chain extender 9 to be read in by the down chain extender 8 and passed to its own associated truncation machine 41. In this manner, the signal IFC is propagated to all sub-bus systems (or all such systems up chain of any fault) thereby setting the truncation machines 41 of these sub-bus systems into their test states TS2. The chain-end system 4 does not, of course, have a truncation machine as it has no down-chain extender.

The truncation machines 41 continue to reside in their test states TS2 until the signal IFC goes false. This condition ($\overline{IFC}$) propagates down the chain in the same manner as the signal IFC itself. Within each sub-bus system, immediately following the signal $\overline{IFC}$ being received by its truncation machine 41, the associated send/receive unit 10 sends out a frame containing $\overline{IFC}$ to its down-chain neighbour. Thereafter, the transceiver 28 returns to its receive mode. Now, if the down-chain sub-bus system is correctly functioning, a frame will be received back from this system by the end-/receive unit 10 within the time out period; this successful receipt of a frame is indicated by the signal VF and is used to cause the associated truncation machine to return to its normal state TS1 in block 70. However, if no valid frame is received back within the time out period then it is assumed that the down-chain sub-bus system is inoperative; in this case, the truncation machine is arranged to pass into its truncate state TS3 in block 72.

Figures 9A, 9B:
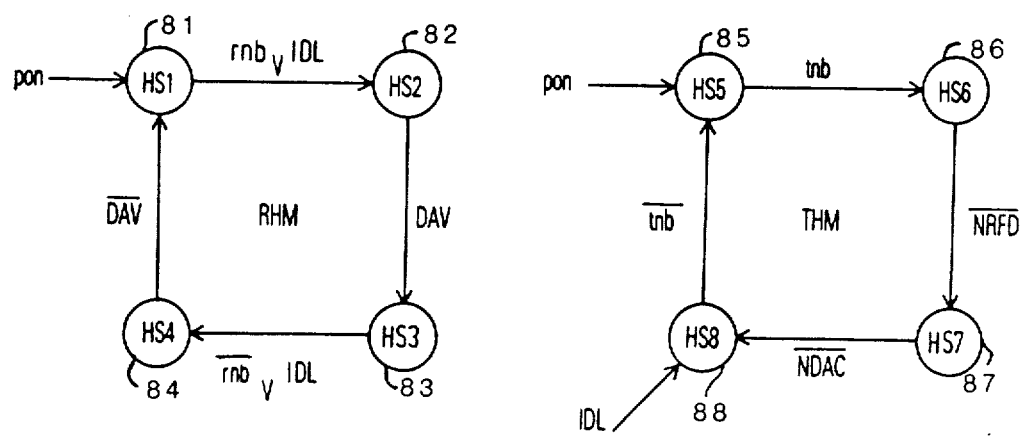
FIGS. 9A and B are state diagrams corresponding to those of FIGS. 3A and 4A respectively but illustrating the modified operation of the handshake machines of the FIG. 6 bus extender when the truncation machine is in its state TS3 of FIG. 8.

As previously-mentioned, when a truncation machine 41 is in its state TS3 it feeds a signal IDL to the handshake machine 20 of the associated down-chain extender 8. In the present embodiment of the invention, the two parts of the handshake machine (that is, the receive-from-bus and transmit-to-bus machines) are modified over the forms giving the state diagrams of FIGS. 3A and 4A to have the state diagrams shown in FIGS. 9A and 9B respectively. FIG. 9A shows states HS1, HS2, HS3 and HS4 as blocks 81, 82, 83 and 84 respectively and FIG. 9B shows states HS5, HS6, HS7 and HS8 as blocks 85, 86, 87 and 88 respectively. The diagram of FIG. 9B shows that the transmit-to-bus handshake machine has been modified to enter and stay in HS8 in block 88 for as long as IDL is asserted. In this state, the machine has its output DAV false; as a result, the THM machine has no effect on the operation of the handshake on the local sub bus since the state of the DAV bus line will be determined by the local source (either a local device 1 or the up-chain extender).

As regards the receive-from-bus handshake machine RHM, this has been modified such that the signal IDL can substitute for the signal rnb (and its inverse) previously received from the down-chain sub-bus system. The extender 9 thus operates as an acceptor with immediate handshake responses; in other words, it effectively free wheels, being pushed round by changes in state of the signal DAV.

Suitable hardware implementations of the state machines RHM, THM represented by the state diagrams of FIGS. 9A and 9B will be readily apparent to persons skilled in the art.

From the foregoing, it can be seen that when the truncation machine 41 is in its third state, the associated down-chain extender 8 continues to operate but with its handshake machine effectively redundant. More generally, it will be appreciated that the chain has been truncated at a point just up-chain of the first non-operative system leaving the remaining sub-bus systems in a working condition.

Upon the next assertion of the signal IFC by the system controller 1A, the truncation machine 41 set in the truncate state TS3 will respond by passing into its test state TS2 as it would have done if starting from state TS1. Note that the truncation machine 41 is still able to receive the signal IFC as its associated extender is still operating as normal except for the freewheeling of its handshake machine.

If now the down-chain sub-bus system has been restored to operation, then when the signal IFC goes false, the truncation machine 41 will in due course receive the signal VF that enables it to return to its normal state TS1.

Figure 10:
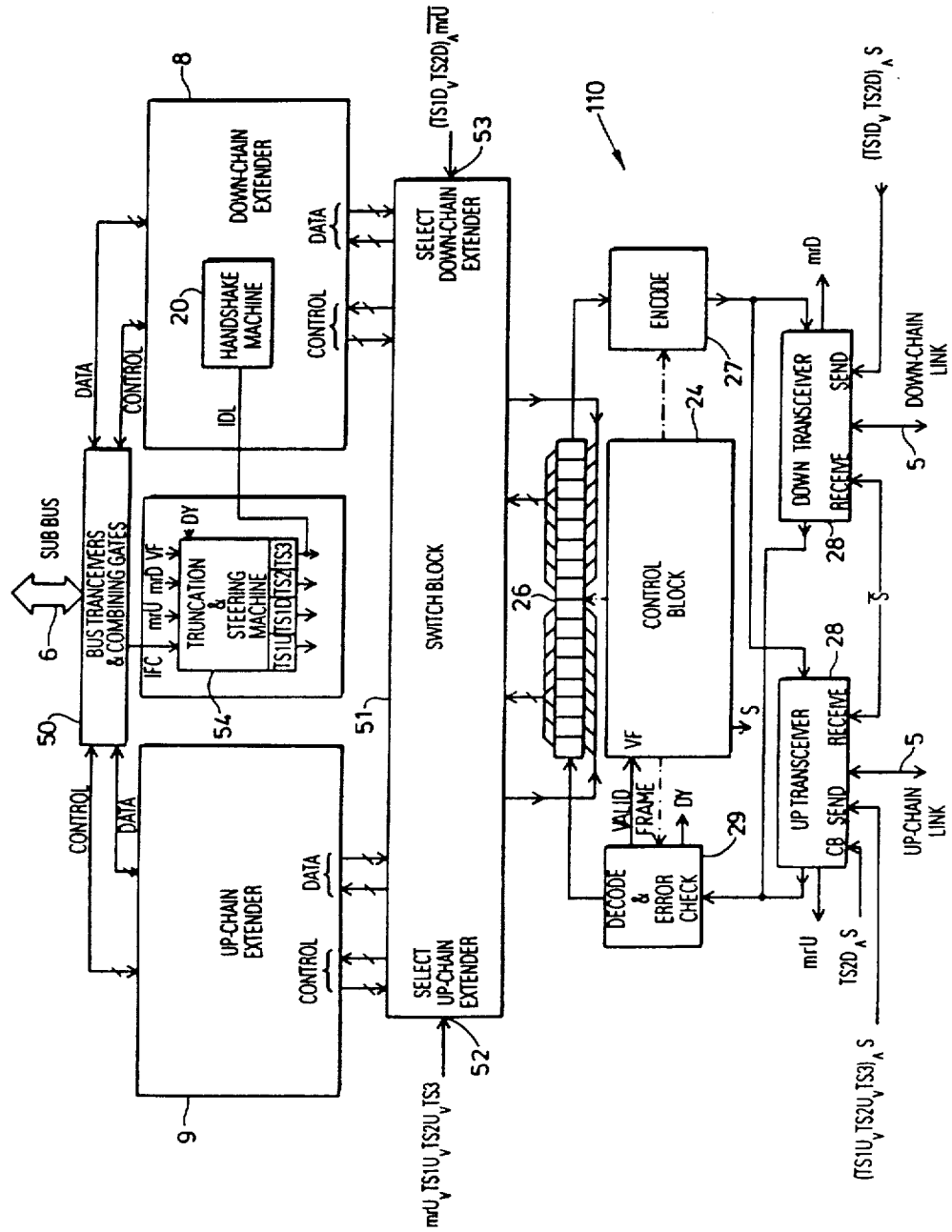
FIG. 10 is a diagram of a communications arrangement made according to a second embodiment of the present invention.

FIG. 10 shows a communications arrangement 7 constructed in accordance with a second embodiment of the present invention and intended for use in an intermediate sub-bus system 3.

In the FIG. 10 arrangement, the up-chain and down-chain extenders 9 and 8 interface with the sub-bus 6 via a common transceiver block 50 and with the up-chain and down-chain links 5 via a common send/receive unit 110.

The transceiver block 50 includes the bus transceivers themselves and combining gates for enabling the two extenders to interface with the same transceiver as appropriate. Apart from the omission of the individual groups of transceivers 13, the extenders themselves may be of substantially the same form as already described with reference to FIG. 2 for the up-chain extender 9 and to FIG. 6 for the down-chain extender 8.

To enable both extenders 8,9 to use the same send-/receive unit 110, a switch block 51 is interposed between the extenders and the unit 110. This switch block 51 has two selection inputs 52,53 for respectively connecting the up chain and down-chain extender 9,8 to the unit 110. The control of the switch block 51 is effected by a combined truncation and steering machine 54; as will be more fully described hereinafter, this machine regulates both the chain truncation function and the switching over of the inputs and outputs of the send-/receive unit 110.

The send/receive unit 110 is similar in form to the unit 10 except that a respective link transceiver 28 is provided for interfacing the unit 110 with the up-chain and down-chain links 5 (these transceivers 28 being hereinafter referred to as the up-transceiver and the down-transceiver respectively). The transceivers 28 are controlled by outputs from the truncation and steering machine 54 in combination with the output S produced by the control block 24 when a frame is to be sent out. The receipt of a frame over the up-chain link 5 causes the up-receiver 28 to produce a signal mrU to indicate that a message has been received over that link; similarly, the down-transceiver is arranged to produce a signal mrD upon receipt of a message over the down-chain link.

With respect to the control block 24 of the send/receive unit 110, the normal operation of this control block is closely similar to that of the FIG. 2 arrangement with the receipt of a valid frame initiating a send sequence; however, in the FIG. 8 control block 24, there is no longer any provision for the initiation of a send sequence after a predetermined timeout period.

The truncation and steering machine 54 is a five-state machine that is arranged to switch between its states in dependence on the signals IFC (derived from the transceiver block 50), mrU, mrD, VF and on a further signal DY the generation of which will be explained later in the description.

Figure 11:
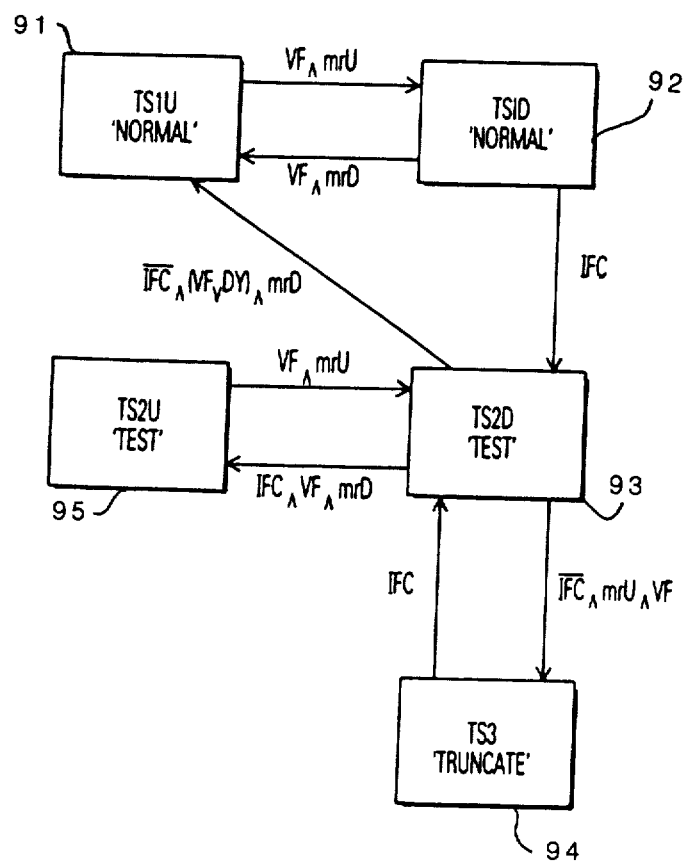
FIG. 11 is a state diagram illustrating the operation of a truncation and steering machine shown in FIG. 10.

As illustrated in FIG.11, the machine 54 has two 'normal' states TS1U in block 91 and TS1D in block 92 which respectively correspond to a frame transmission/reception cycle over the up-chain link 5 and a frame transmission/reception cycle over the down-chain link. Similarly, the machine has two 'test' states TS2U in block 95 and TS2D in block 93 respectively corresponding to frame transmission/reception cycles over the up-chain and down-chain links. The machine 54 also has a truncate state TS3 in block 94.

The sequencing of the operation of the machine 54 relative to that of the send/receive 110 following assertion of VF is similar to the sequencing illustrated in FIG. 7 for the machine 41 and unit 10, the only significant difference being that now the four signals VF, mrU, mrD and DY are passed to the machine 54 and are reset when indicated rather than just the signal VF.

In operation, the machine 54 normally switches between its states TS1U in block 91 and TS1D in block 92 in dependence on the reception of a valid frame over either link. Thus, assuming a frame has just been received over the up-chain link 5 and passed on to the up-chain extender 9, the signals VF and mrU will be asserted which causes the machine 54 to pass into its TS1D state. As a consequence, the switch block 51 changes over to interface the unit 110 with the down-chain extender 8, the down transceiver 28 is set in its send-frame mode and the up transceiver is set into an inactive state (the conditions determining the states of the switch block 51 and transceivers 28 are indicated in FIG. 8 by logic expressions in which the logical AND function is represented by the symbol ∧ while the logical OR function is represented by the symbol ∨ ).

Thereafter, following a short delay, a send sequence is initiated and a frame is then sent out over the down-chain link from the down-chain extender 8. Upon completion of the send operation, both transceivers 28 listen on their respective links. In normal operation, a frame will in due course arrive over the down-chain link and be passed on to the down-chain extender 8. Thereafter, the machine 54 passes into its state TS1U in block 91 to set up the switch block 51 and unit 110 for a transmission and reception cycle over the up-chain link 5.

From the foregoing, it can be seen that the normal operation of the FIG. 10 communications arrangement is to shuttle a frame down and up the chain with only one frame being in transit at a time. This avoids the possibility of frames being simultaneously received by a unit 110 over both links 5 connected thereto. The communications arrangement of the chain-end sub-bus system is of course arranged to transmit a frame back up the chain after receiving one over the up-chain link rather than attempting to send a down-chain frame. Similarly, the communications arrangement of the chain-head sub-bus system simply transmits and receives over its down-chain link. The chain-head and chain-end communication arrangements may thus have a functional form similar to FIGS. 6 and 2 respectively. Note that the send/receive unit 10 of the chain-head sub-bus system has a timeout longer than the maximum possible time for a frame to pass both ways over the chain so that frames will be sent at intervals regardless of whether or not any frame is received back.

Returning to the consideration of the intermediate communications arrangement shown in FIG. 10, should the neighbouring down-chain sub-bus system become inoperative, the whole installation will freeze not only because the handshake procedure in the illustrated down-chain extender 8 is frozen, but also because no frames are passed back up the chain.

If the signal IFC is now asserted by the controller 1A, this signal is propagated down the chain since not only will the chain-head send/receive unit transmit a frame with the signal after the aforesaid time-out period has lapsed, but each intermediate send/receive unit is arranged upon receiving a frame over its up-chain link 5 to pass that frame to the up-chain extender. The receipt of the frame over the up-chain link will of course generally be unexpected as the unit will be waiting patiently for a frame over the down-chain link; however, the requisite out of sequence switching of the switch block 51 is achieved by feeding the signal mrU to the selection input 52.

Upon the signal IFC being latched into the truncation and steering machine 54, the latter passes into its test state TS2D in block 93. In this state, the down-chain extender is connected to the send/receive unit 110 and the down-transceiver is enabled to send. As a result, the send sequence triggered by the receipt of the frame containing IFC causes a frame (also containing IFC) to be sent out down the chain. In addition, the up-transceiver 28 is arranged to send a dummy frame of predetermined content back up the chain, this being indicated in FIG. 10 by the input TS2 ∧ S to input CB of the up-transceiver 28.

After the down-chain transmission of the frame containing IFC and the up-chain transmission of a dummy frame, the send/receive unit 110 returns to listening on both links. Except for the case of the pen-ultimate sub-bus system, if the next down-chain send/receive unit is correctly functioning a dummy frame will shortly be received back therefrom. This dummy frame is arranged to be recognized by the decoder 29 which produces a corresponding output signal DY; the signal VF is not, however, produced as the frame content is chosen such as to be invalid (for example, with a parity error present). As a consequence, the receipt of a dummy frame does not initiate a send sequence. The generation of the signal DY is, however, arranged to cause the control block 24 to pass the signals DY and mrD to the truncation machine 54, the control block subsequently resetting the signals and returning to its receive state.

The pen-ultimate sub-bus system will not receive a dummy frame over the down-chain link but will, instead, receive a valid frame from the chain-end sub-bus system (assuming the latter is functioning correctly). The receipt of a valid frame over the down-chain link while the truncation machine is in its state TS2D in block 93 is arranged to cause the machine to pass into its state TS2U in block 95 and to send out a valid frame up the chain. The receipt of this frame by the up-chain sub bus system will cause the truncation machine of that system to similarly switch to its state TS2U and will trigger off the sending of a frame over the next up-chain link and so on. Thus the shuttling of a frame down and up the chain will proceed as normal if the chain is fully functional.

As a result either of the receipt back of a valid frame or due to the expiry of its timeout period, the chain-head communications arrangement will periodically send out another frame. While IFC is asserted, the effect of this frame will be to switch the truncation machine of the receiving sub-bus system into its state TS2D in block 93 (if not already in this state), and to instigate the forwarding on of a similar frame together with the passing back of a dummy frame. In due course the signal IFC will go false and this change will be propagated along the chain. As each sub-bus system receives the signal $\overline{IFC}$, its truncation and steering machine first returns to its state TS2D (if not already in this state) and is then primed ready to pass out of this state. However the machine remains in its state TS2 until the next frame is received.

If the neighbouring down-chain system is functional, then the next frame received should be from that system, this being either the dummy frame that the neighbouring system transmits in the up-chain direction when passing on the $\overline{IFC}$ signal, or in the case of the penultimate system, a valid frame. In either case, the machine 54 is arranged to pass into its normal state TS1U in block 91, these conditions being indicated to the machine 54 by the signals mrD and either VF or DY. Upon entering state TS1U, the machine 54 sets up the send-/receive unit 110 for transmitting and receiving a frame over the up-chain link; however, a frame will only be transmitted over the link if a valid frame, rather than a dummy frame, was received.

If the neighbouring down-chain system is inoperative, the next valid frame received will be over the up-chain link. In this case, the macine 54 passes into its truncate state TS3 in which it causes the handshake machine 20 of the down-chain extender to freewheel in the manner previously described. In addition, when in its state TS3 in block 94, the machine 54 controls the switch block 51 to connect the up-chain extender 9 to the send/receive unit 110 and ensures that transmission and reception takes place only via the up transceiver 28. In this manner, the intermediate communications arrangement of FIG. 10 is functionally transformed into a chain-end communications arrangement with receipt of a frame over the up-chain link being followed by a frame transmission over the same link. The chain is thus effectively truncated at the last operative sub-bus system. Finally, if IFC is asserted while the machine 54 is in its state TS3, the machine 54 is arranged to pass into state TS2D in block 93 and to attempt to transmit the IFC signal on down the frame.

Various modifications to the above-described embodiments of the present invention are, of course, possible. Thus for example, instead of arranging for the handshake machine 20 of a down-chain extender 8 to freewheel when the associated truncation machine is in its truncate state TS3 in block 94, the sub bus handshake lines could be isolated from the extender.

Furthermore, the intermediate communications arrangement shown in FIG. 10 can be made configurable to serve as either a chain-head or a chain-end communications arrangement.

It will, of course, be appreciated that although the present invention has been described in relation to a straight chain of sub-bus systems, it is equally applicable to branched chains.

I claim:

1. Apparatus for testing and maintaining a first sub-bus system in a chain-link configured bus system having two or more sub-bus systems, comprising:

bus extender means connected to the first sub-bus system, and to a second sub-bus system which is connected to the bus extender means and adjacent to the first sub-bus system, for controlling data transfer between the first sub-bus system and the second sub-bus system according to a predetermined handshake procedure common to all sub-bus systems which requires the ability to transfer data from all sub-bus systems electronically connected to the bus system; and truncation means connected to the extender means having a first state, a second state, and a third state, for allowing data transfer between the first sub-bus system and the second sub-bus system while in the first state, for testing the ability of the second sub-bus system to transfer data while in the second state, and for electronically truncating the second sub-bus system from the bus system while in the third state; wherein the truncation means is initially in the first state, enters the second state from the first state in response to a pre-determined control input, and enters the third or first state from the second state in response to a negative or positive test result, respectively; whereby the bus system continues operating without the second sub-bus system after failure of the second sub-bus system.

* * * * *